United States Patent [19]

Crawford

[11] 4,256,136
[45] Mar. 17, 1981

[54] MECHANICALLY OPERATED LEVEL CONTROL FOR DISHWASHERS

[75] Inventor: John G. Crawford, Louisville, Ky.

[73] Assignee: General Electric Company, Louisville, Ky.

[21] Appl. No.: 145,524

[22] Filed: May 1, 1980

Related U.S. Application Data

[63] Continuation of Ser. No. 970,825, Dec. 18, 1978, abandoned.

[51] Int. Cl.³ .............................................. F16K 31/34
[52] U.S. Cl. .................... 137/387; 134/56 D; 137/428; 137/429; 137/448; 137/630.15
[58] Field of Search .................. 134/56 D, 56 R, 387, 134/409, 428, 429, 430, 434, 448; 4/395, 396; 251/38, 40

[56] References Cited

U.S. PATENT DOCUMENTS

| | | | |
|---|---|---|---|
| 172,843 | 2/1876 | Boyle | 251/38 |
| 722,106 | 3/1903 | Hogan | 251/38 |
| 1,275,565 | 8/1918 | Junek, Jr. | 137/428 |
| 1,796,165 | 3/1931 | Roust | 137/428 |
| 2,164,760 | 7/1939 | Wesson | 251/40 |
| 2,406,259 | 8/1946 | Russell et al. | 251/40 |
| 2,559,046 | 7/1951 | Peters et al. | 137/434 |
| 2,781,772 | 2/1957 | Russell | 137/630.15 |
| 3,279,742 | 10/1966 | Billeter | 251/40 |
| 3,464,437 | 9/1969 | Zane | 137/387 |
| 3,643,681 | 2/1972 | Simmons | 137/429 |
| 3,726,303 | 4/1973 | Allen et al. | 137/630.15 |
| 3,835,880 | 9/1974 | Hoffman et al. | 137/387 |
| 3,894,555 | 7/1975 | Payne | 137/429 |
| 3,982,557 | 9/1976 | Acevedo | 137/448 |
| 4,119,116 | 10/1978 | Johnson et al. | 137/387 |

FOREIGN PATENT DOCUMENTS

606167 7/1960 Italy.
421833 1/1935 United Kingdom ..................... 251/40

Primary Examiner—Martin P. Schwadron
Assistant Examiner—G. L. Walton
Attorney, Agent, or Firm—H. Neil Houser; Radford M Reams

[57] ABSTRACT

A level control arrangement for dishwashers in which the inflow to the dishwasher tub from the water supply line is automatically terminated when the water level in the tub reaches a predetermined level. The arrangement includes a two-stage level control valve disposed in a valve housing installed downstream of the water fill valve. The valve is moved into and out of engagement with the valve housing in response to a connector which in turn is in operative engagement with a stem of a float positioned in the dishwasher tub. When the water level in the tub approaches a predetermined washing level, the float rises in the tub to a position where the connector permits the valve to move to a sealing position, thereby terminating further flow to the dishwasher tub. When the water is drained from the tub, the float stem moves the connector thereby releasing the pressure exerted against the sealed valve through a port located within the valve. Further movement of the float stem and the connector opens the valve, thereby resetting the arrangement for the next fill sequence.

8 Claims, 4 Drawing Figures

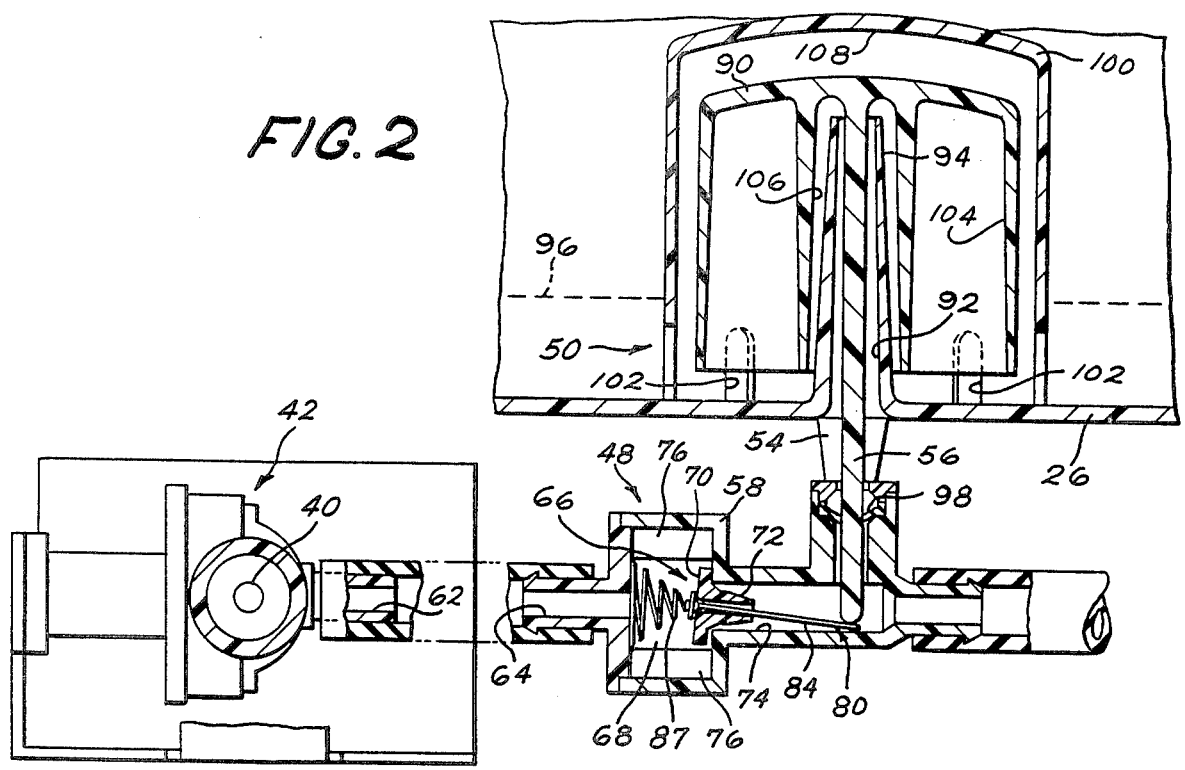
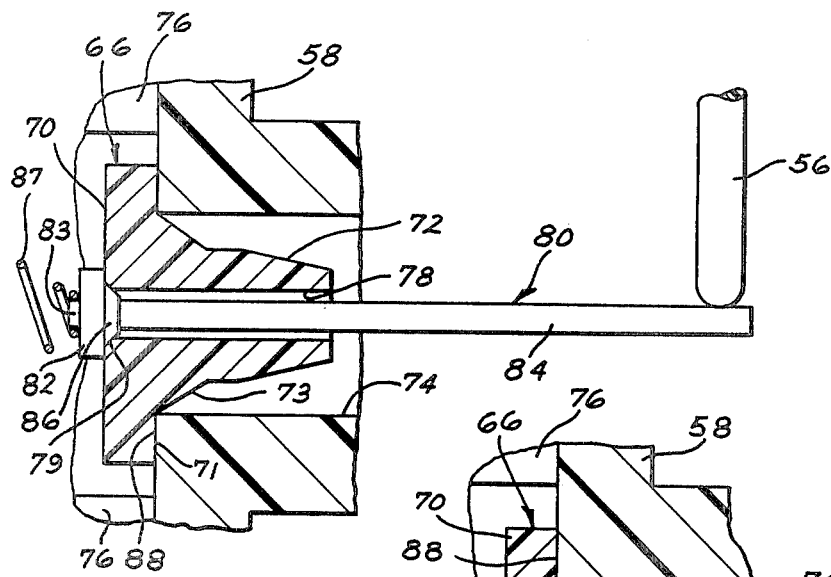
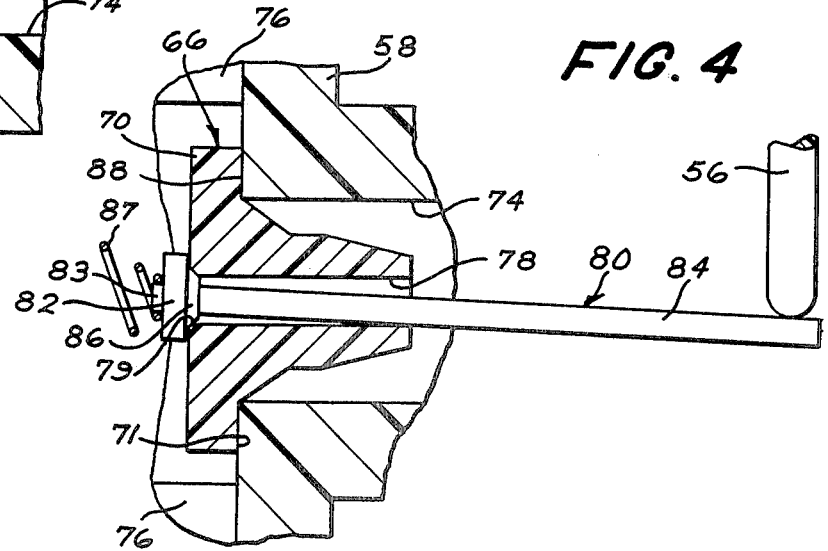

MECHANICALLY OPERATED LEVEL CONTROL FOR DISHWASHERS

CROSS REFERENCE TO RELATED MATTER

This application is a continuation of copending patent application Ser. No. 970,825, filed Dec. 18, 1978, now abandoned, the disclosure of which is hereby incorporated by reference. This application relates to commonly assigned, copending patent application (Ser. No. 145,525, filed May 1, 1980) which is a continuation of patent application Ser. No. 970,826, filed on Dec. 18, 1978, now abandoned.

BACKGROUND OF THE INVENTION

Modern automatic dishwashers generally include automatic control of in-flow of water from the water supply line into the machine. This automatic control is typically provided by a timer which causes a fill valve to be opened at the appropriate point in the machine cycle for a predetermined time interval, allowing water flow into the dishwasher tub during this interval. These "time fill" arrangements require close tolerances of both the timer mechanism and the water fill valve. That is, it is normally desirable to integrate the timing mechanism and the water fill valve such that the changes in line pressure, which vary with the time of day and from locality to locality, are adequately compensated to prevent overfill and/or underfill conditions. Overfill results in a waste of energy and underfill normally causes poor washing performance.

These automatic control arrangements taught by the prior art also create the possibility of a flooding condition being reached when water overflows from the tub and out of the machine which may cause damage. Such a flooding condition may occur for a variety of reasons, such as failure of the fill valve, over-pressure line conditions, a clogged dishwasher drain, etc. Many dishwasher designs accordingly provide for some arrangement for flood control. In some of these designs a fail-safe mechanism is incorporated into the electrical control which will correct flood level conditions occurring during the machine cycle. Some failure modes, however, such as a mechanical failure of the valve, may occur at any time, not only during the machine operation.

Thus, it is desirable to have 24-hour flood protection. For example, in U.S. Pat. No. 3,894,555, a flood control feature is disclosed in which a float is mounted within the dishwasher tub which acts to deenergize a secondary electrically operated valve installed downstream from the fill valve. If a flood level occurs in the tub, the float rises to the flood level and acts to operate an associated switch to open the circuit to the secondary flood control valve, causing closing of the valve and cessation of the flow to the tub. The secondary valve however adds significantly to the expense of manufacture, since an additional relatively costly electrically operated valve is required. In addition, the reliability of electrically operated valves is less than mechanically operated valves and any failure of the valve will cause either malfunction of the dishwasher or defeat the flood control feature.

Accordingly, it is an object of the present invention to provide a mechanically operated level control arrangement for dishwashers.

It is a further object of the present invention to provide 24 hour flood control protection by terminating in-flow to the dishwasher tub whenever the level in the tub rises above a predetermined optimum washing level.

It is still a further object of the present invention to provide a level control feature which operates in a highly reliable manner, but does not substantially add to the cost of manufacture of the machine.

Another object of the present invention is to provide a level control for a dishwasher which is responsive to a predetermined optimum fill level for the dishwasher and which is operatively accurate regardless of line pressure variances.

A further object of the invention is to provide a level control arrangement for a dishwasher which can be easily incorporated in present dishwasher designs and through utilization of presently available parts requires only a minor modification.

SUMMARY OF THE INVENTION

These and other objects of the invention, which will become apparent upon a reading of the following specification and claims, are accomplished by the provision of a level control valve arrangement including a movable sealing valve body or plunger in a housing having an internal opening establishing fluid communication from the fill valve through the level control valve to the dishwasher tub. The valve body is provided with a head having a sealing surface and is adapted to be urged into sealing engagement with a valve seat surface in the valve housing by water line pressure to prevent flow into the dishwasher. The valve includes an axially extending stem portion in which is received an actuating connecting arm which is operative to sealingly engage with a pressure relief port located in the valve head. The actuating arm is in operative engagement with a float stem connected to a float disposed within the dishwasher tub. The normally open level control valve permits water to enter the dishwasher tub whenever the fill valve is actuated in response to a timing device. As the water and therefore the float rises in the tub, the actuating arm responsive to the float position permits the valve head to seal against the valve housing when the float reaches a predetermined level. When the washing fluid is drained from the dishwasher, the float lowers causing the valve stem to move the actuating arm thereby relieving the line pressure against the pressurized side of the sealing valve through the pressure relief port. Further lowering of the float stem against the actuating arm causes the arm to engage the sealing valve stem, thereby opening the valve for the next fill sequence.

DESCRIPTION OF THE DRAWINGS

Other features and advantages will be apparent from the following description taken in conjunction with the accompanying drawings wherein:

FIG. 2 is a view in partial section of the major components of one form of the level control arrangement according to the present invention as shown in FIG. 1.

FIGS. 3 and 4 are partial sectional views of the sealing valve and associated housing and connecting member depicting the sealing valve in its closed and pressure relief stages of operation, respectively.

DETAILED DESCRIPTION

Figure 1:
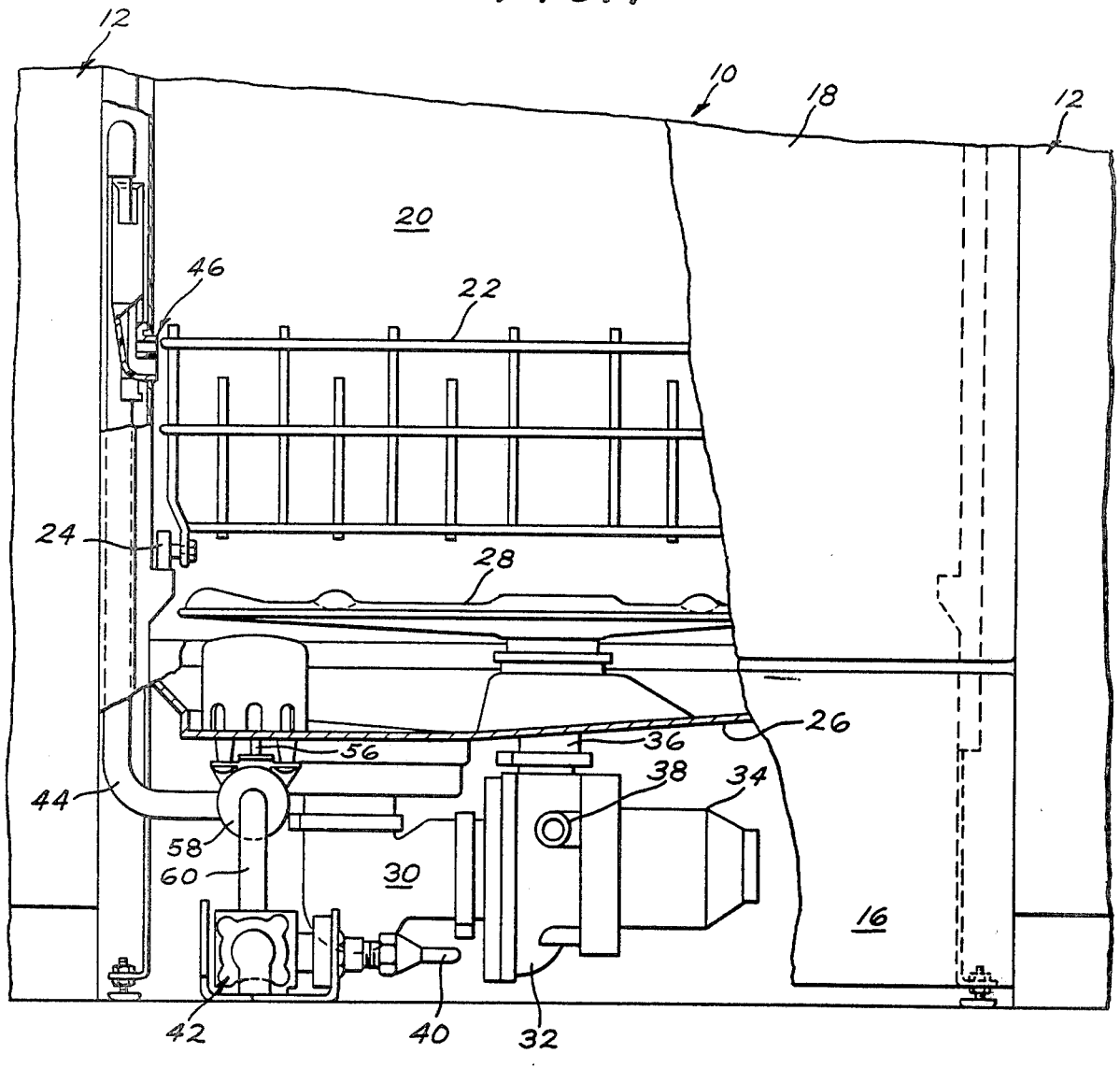
FIG. 1 is a fragmentary view of a dishwasher in front elevation shown in partial section to depict the relationship of the components of one form of the present invention to the dishwasher structure.

In the following detailed description of the preferred embodiment of the instant invention certain specific terminology will be employed for the sake of clarity and a particular embodiment described in accordance with requirements of 35 USC 112, but it is to be understood that the same is not intended to be limiting and should not be so construed inasmuch as the invention is capable of taking many forms and variations within the scope of the appended claims.

Referring to the drawings, and particularly FIG. 1, a conventional dishwasher 10 is depicted into which is incorporated the level control arrangement according to the present invention. The dishwasher illustrated is of the built-in cabinet style, installed between adjacent kitchen cabinetry 12. The dishwasher 10 includes an inner frame 14 to which is mounted the outer cabinet panel 16 which provides access to the operating components. Front mounted door 18 provides access to the interior 20 of the dishwasher.

In the interior of the dishwasher 20 are mounted one or more racks 22 adapted to receive dishware items to be washed. Such racks 22 are mounted on rollers 24 for in and out movement for convenient loading of the dishware items.

The lower region of the interior 20 is comprised of a tub 26 which acts to collect the water introduced into the machine and directed in a high pressure spray at the dishware items. The washing action is carried out by means of a rotary spray arm 28 into which is circulated water under high pressure in order to wash and rinse the dishware items disposed in racks 22.

The water collected in tub 26 is directed through an inlet fitting 30 to the inlet side of a pump 32, driven by an electric motor 34.

The outlet 36 of pump 32 communicates with internal flow passages to provide the high pressure circulation to the rotary spray arm 28 during the wash and rinse cycles. After the wash and rinse cycles, the water in tub 26 is pumped via drain outlet 38 to a plumbing drain.

An automatic fill arrangement is provided for introducing the water from the hot water connection into the machine. This arrangement conventionally includes a hot water pipe shown partially at 40 which is in communication with the hot water supply. The hot water pipe 40 is in fluid communication with a fill valve assembly 42 which is solenoid operated to establish a timed interval of communication at the appropriate points in the machine cycle with a fill hose 44. Fill hose 44 extends upwardly along the dishwasher cabinetry and is placed in communication with a fill nozzle fitting 46 which directs the hot water into the interior of the machine during the fill cycle.

The level control arrangement 48 according to the present invention, acts to mechanically provide the proper volume of water necessary for the wash and rinse cycles by termination of water flow from the fill valve assembly 42 to the tub 26 whenever a predetermined optimum amount of water has been admitted to tub 26. Level control valve assembly 48 is mounted below the float assembly 50 by a plurality of screws 52 adapted to engage with boss members 54 protruding from the tub 26. The assembly is located such that float stem 56 is received within the housing 58 of the level control means 48 as is better seen in FIG. 2. The fill valve assembly 42 and the level control assembly 48 are interconnected by a hose 60.

The level control arrangement as seen in FIG. 2 consists of a combination of a two-stage level control valve assembly 48 and a float assembly 50. The level control valve 48 is in fluid communication with the fill hose 44 and the fill valve assembly 42. A short length of hose 60 joins the outlet fitting 62 of the fill valve assembly 42 and an inlet fitting 64 of the level control valve 48. The outlet of the level control valve 48 is secured to the fill hose 44 to thus be placed in fluid communication with the fill circuit downstream of the fill valve assembly 42.

The level control valve 48 consists of the valve housing 58 within which is movably mounted a sealing plunger or valve body 66. The valve housing 58 is formed with a relatively large diameter inlet chamber 68 which receives a sealing head portion 70 of the valve 66. A stem 72 of the valve body or plunger 66 extends into an elongated passage 74 of housing 58 which is in communication with the inlet chamber 68. Passage 74 has a larger diameter than the stem 72 to allow water flow between the stem 72 and the passage 74 and to allow valve 66 to be tilted from its axis without engagement of stem 72 with the passage 74. Sealing head 70 is maintained in position in the inlet chamber 68 by a plurality of circumferentially spaced webs 76 and by abutment of the conically shaped shoulder 73 with the upstream terminus of passage 74. In the normally open position, water flows around the sealing head 70 and into the passage 74 with the sealing valve 66 held in position as shown in FIG. 2.

Received within a passageway 78, which extends axially of the valve 66, is a connecting or actuating arm 80 as is better seen in FIG. 3. The actuating arm 80 has an enlarged terminal end 82 and an axially extending portion 84 which abuttingly engages the float stem 56. End 82 has an integral conically extending shoulder 86 which is received in sealing engagement with a complementary conically formed pressure relief port 79 at the upstream terminum end of passage 78. The latter feature is better seen in reference to FIG. 4. End 82 also has a spring engagement shoulder 83 extending axially into chamber 68 for operative engagement and location of spring member 87. Spring 87 is designed to close valve 66 in the absence of any vertical force applied by stem 56 and in the absence of adequate line pressure for reasons discussed below. The upstream surface dimension of end 82 transverse to the axis of member 80 is substantially less than the upstream surface dimension of head 70 so that a relatively low downward force applied by float stem 56 against arm extension 84 is all that is required to bleed or relieve the pressure in chamber 68. Thus, presently available dishwasher floats (i.e., relatively small and therefore light weight) may be used to provide the forces required to open valve 66 as will be described below.

In reference to FIG. 4, it can be seen that the connecting arm extension 84 engages with the downstream terminal end of passage 78 of valve plunger 66 which upon further downward movement of float stem 56 causes plunger 66 to pivot about its seal engagement surface 71 at the top thereof, thereby opening the valve to the eventual position shown in FIG. 2. The first pivotal motion of shoulder 86 of actuating arm 84 about the aperture 79 of the plunger 66 may be designated as the pressure relief or first stage of operation, as shown in FIG. 4, and the further pivotal motion of plunger 66 about its sealing engagement surface 71 to the open position shown in FIG. 2 may be designated as the second stage of valve operation.

One skilled in the art will appreciated that the effective inlet water pressure received from the fill valve assembly 42 acts on the sealing head 70, thereby urging the sealing plunger 66 to the right as viewed in FIG. 3. The valve sealing surface 71 provided on the opposite face of the sealing head 70 from the direction of water pressure is adapted to engage an annular surface 88 formed on the end wall of the inlet chamber 68 such that upon movement into engagement therewith, the water flow downstream of the flow control valve 66 is terminated. The sealing plunger 66 is maintained in its unseated-open position shown in FIG. 2 by the reaction of the float stem 56 against the actuating arm extension 84 which in turn pivots plunger 66 as was previously described.

The float stem 56 moves with a float 90 positioned in the bottom of tub 26, the float stem 56 passing through the interior opening 92 of a float guide 94. Float guide 94 extends upwardly above the predetermined wash level indicated in phantom as line 96 such that water will not flow through the interior opening 92 through which the float stem member 56 enters.

A seal or rolling diaphragm 98 is provided in the plunger housing 58 which prevents the water from passing out between the float stem member 56 and the plunger housing 58.

Surrounding the float 90 is a protective float housing 100 with inlet cutouts 102 provided to enable the water to pass into the interior of the float housing 100. Float 90 is provided with an annular valve chamber 104 with an inner opening 106 provided adjacent the float guide 94 to enable venting of the air and allowing the water level to thereby rise into the interior 108 of the float housing 100. The float guide 94 also insures guiding movement of the float to prevent tipping.

The relative weight and buoyancy of the float 90 is such that it will not rise in the housing appreciably until the predetermined wash level indicated at line 96 is approached. At this point, the buoyancy force moves the float 90 vertically upwardly permitting the actuating arm 84 to also rise in response to both the decreased force applied to the valve stem 56 and the line pressure applied against valve head 70. The water pressure thus acts on the sealing head 70 to force the same into sealing engagement with the valve sealing surface 88 to shut off further water in-flow to the dishwasher. The buoyant force is increased by the annular valve chamber 104 and may be contributed to by buoyancy of the material itself by employing a molded plastic material with specific gravity less than one.

In the event fill valve 42 develops a "dripping" leak when the dishwasher is in an idle mode, i.e when valve 66 is in the open position as shown in FIG. 2, the water collected in tub 26 may raise float 90 to a level where float stem 56 will tend to become disengaged from arm 84. This could cause a "flood" problem since the line pressure would probably not be sufficient to close valve 66. However, spring 87 has been included to close valve 66 if this condition should occur.

Accordingly, it can be seen that an entirely mechanically operated level control arrangement is provided which does not require operation of the electrical controls of the dishwasher. This level control arrangement provides the proper level of washing liquid regardless of variances in line pressure and regardless of the tolerances associated with either the timer or the fill valve and its related controls. Further, with the inlet water pressure creating the valve sealing action, flood conditions are prevented from occurring, regardless of whether these are electrical or mechanical failures or some other condition occurs such as a clogged drain.

It can be seen that this design achieves the above-recited objects of the invention, producing a relatively simplified but reliable and mechanical level control arrangement while simultaneously providing against flooding, which arrangement may be incorporated at a relatively low cost.

Although one embodiment is shown and described, it is apparent to one skilled in the art that improvements and modifications may be made hereto without affecting the scope of the appended claims.

I claim:

1. In a dishwasher of the type having a water collecting tub, liquid supply means including an electrically operated fill vavle means for providing controlled inflow of liquid to the tub in response to a timing device, and means for draining liquid from the tub; a liquid level control arrangement for providing a predetermined amount of liquid to the tub, said level control arrangement comprising:

(a) float means disposed within the buttom region of said tub, said float means being constructed and arranged to be raised and lowered in response to the rising and falling, respectively, of the liquid level in the tub, said float means moving to a full position when the liquid level in the tub rises to a predetermined full level;

(b) a two-stage level control valve means interposed in the liquid supply means downstream of the fill valve means and including a valve housing having a valve seat formed therein, and a valve head with an integrally formed stem, said valve head having an upstream pressure relief port and a downstream seat engagement surface adapted for selective sealing engagement with said seat to close said valve, said stem having an internal passageway extending axially therethrough in fluid communication with said pressure relief port;

(c) actuating means constructed and arranged to operatively couple said level control valve means and said float means, said actuating means including an actuating member extending through said internal passageway in said valve head, said actuating member being movable between a sealing position in which said valve head is in sealing engagement with said valve seat and said one end is in sealing engagement with said pressure relief port, a first stage position in which said one end of said actuating member is out of sealing engagement with said pressure relief port and a second position in which said actuating member positions said valve head out of sealing engagement with said valve seat;

(d) biasing means operative to position said actuating member in its sealing position when said float means is in its full position thereby preventing further in-flow of liquid to the tub;

(e) means interconnecting said float means and said actuating member for sequentially moving said actuator member from its sealing position to its first stage position and then to its second stage position in response to the liquid level in the tub falling below the full level as the liquid is removed from the tub by the drain means; whereby the control valve means is closed when the liquid level in the tub rises to said predetermined full level and is opened in two sequential stages of operation as liquid is drained from the tub.

2. The level control arrangement of claim 1 wherein said valve housing includes an inlet chamber in fluid communication with the fill valve means, said valve head being disposed within said chamber, and wherein said housing includes a bore formed therein downstream of said chamber in fluid communication with said chamber, said valve stem being loosely received within said bore.

3. The level control arrangement of claim 2 wherein said one end of said actuating member comprises an enlarged terminal portion projecting from said pressure relief port into said inlet chamber, said terminal portion being adapted for selective sealing engagement with said pressure relief port and arranged for pivotal movement out of said sealing engagement as said actuating member moves from its sealing position; and wherein said interconnecting means comprises a float stem member projecting from said float into said bore and an actuating arm portion of said actuating member extending axially from said valve stem into said bore for engagement with said float stem, said float stem being operative to engage said actuating arm to sequentially move said actuating member from its sealing position to its first stage position and its second stage position in response to lowering of said float from its full position.

4. The level control arrangement of claim 3 wherein the upstream surface area of said terminal portion of said actuating member transverse to its axis is substantially less than the upstream surface area of said valve head transverse to its axis.

5. In a washing appliance of the type having a liquid collecting tub, liquid supply means for providing liquid to the tub including an electrically operated fill valve and means directing liquid from the outlet of the electrically operated valve into the tub, a liquid level control arrangement comprising:

(a) liquid level control valve means interposed in the liquid supply means downstream of the fill valve means comprising a valve housing having an inlet chamber and a valve seat formed therein and a sealing plunger including a head portion, a stem portion and an internal passageway extending axially therethrough from a pressure relief port formed in said head portion, said valve head being adapted for selective movement into sealing engagement with said valve seat;

(b) a float disposed in the bottom region of the tub, said float being constructed and arranged for vertical movement in response to fluctuations in liquid level in the tub and operative to rise to a predetermined full position upon rising of the liquid level in the tub to a predetermined full level;

(c) an elongated actuating arm extending through said passageway in said valve plunger having at one end an enlarged terminal portion for selective sealing engagement with said pressure relief port; said actuating arm being movable between a closed position in which said terminal portion sealingly engages said pressure relief port, a relief position in which said terminal portion is out of sealing engagement with said pressure relief port and an open position in which said actuating arm positions said valve head portion out of sealing engagement with said valve seat;

(d) bias means for urging said actuating arm into its closed position and operative to move said arm to its closed position when said float means is in its full position thereby preventing further in-flow of liquid to the tub;

(e) means interconnecting said float means and said actuating arm and operative to move said actuating arm from its closed position to its relief position and then to its open position as said float means lowers in response to the liquid level in the tub falling below the full level as liquid is removed from the tub by the drain means; whereby the control valve means is closed when the liquid level in the tub rises to the full level and sequentially opens as liquid is drained from the tub.

6. The level control arrangement according to claim 5 wherein said interconnecting means comprises a float stem member secured to said float and extending downwardly through the tub bottom into the interior of said plunger housing, and the other end of said actuating arm projecting from said valve stem for engagement with said float stem member.

7. The level control arrangement according to claim 6 wherein said plunger housing includes a bore in communication with said inlet chamber, said stem portion of said plunger being loosely received in said bore permitting within said bore selective pivotal movement of said head portion of said valve plunger out of sealing engagement with said valve seat, said actuating arm being operative in moving to its open position to engage the wall of said passageway in said plunger and pivot said head portion out of sealing engagement with said valve seat.

8. In a washing appliance having a liquid collecting tub, liquid supply means including an electrically controlled fill valve and means for directing liquid from the outlet of the fill valve into the tub and drain means for removing liquid from the tub, a liquid level control arrangement comprising:

level control valve means interposed in the liquid supply means between said fill valve and said tub, said level control valve means comprising: a valve housing, said valve housing including an inlet pressure chamber formed therein and a bore in communication with and extending downstream from said chamber, said inlet chamber including a valve seat formed therein; and a plunger including a head portion received within said chamber and a tapered stem portion projecting through said valve seat into said bore, said plunger being pivotally movable within said bore between a closed position in which said head portion is in sealing engagement with said valve seat and an open position in which said head is pivoted out of sealing engagement with said valve seat, said plunger having a passageway extending axially therethrough, terminating upstream in a pressure relief port formed in said head portion;

an actuating arm loosely received in said plunger passageway to permit pivotal movement of said arm within said passageway, said arm including at one end an enlarged terminal portion projecting through said pressure relief port into said inlet chamber, the other end of said arm projecting from said stem portion into said bore, said actuating arm being operative in a first position to place said terminal end into sealing enegagement with said relief port, in a second position to place said terminal portion out of sealing engagement with said pressure relief port and in a third position to engage the wall of said passageway and pivot said head portion of said plunger out of sealing engagement with said valve seat;

biasing means for urging said actuating arm into its first position and for urging said plunger head portion to its closed position;

a float member disposed within the tub near the tub bottom for vertical movement in response to changes in the liquid level in the tub, said float member including a float stem portion projecting downwardly through the tub bottom into said bore for abutting engagement with said other end of said actuating arm, said float being constructed and arranged to assume a full position when the liquid level in the tub reaches a predetermined full level, said float being operative in its full position to enable said plunger to assume its closed position and said actuating arm to assume its first position in response to said biasing means, thereby preventing liquid from entering the tub from the liquid supply means when the liquid level rises to the full level; said float means being further operative to pivot said actuating arm sequentially from its first position to its second position and then to its third position as the float lowers from its full position as liquid is removed from the tub by the drain means, thereby opening said level control valve to enable entry of liquid into the tub from said liquid supply means.

* * * * *